UNITED STATES PATENT OFFICE.

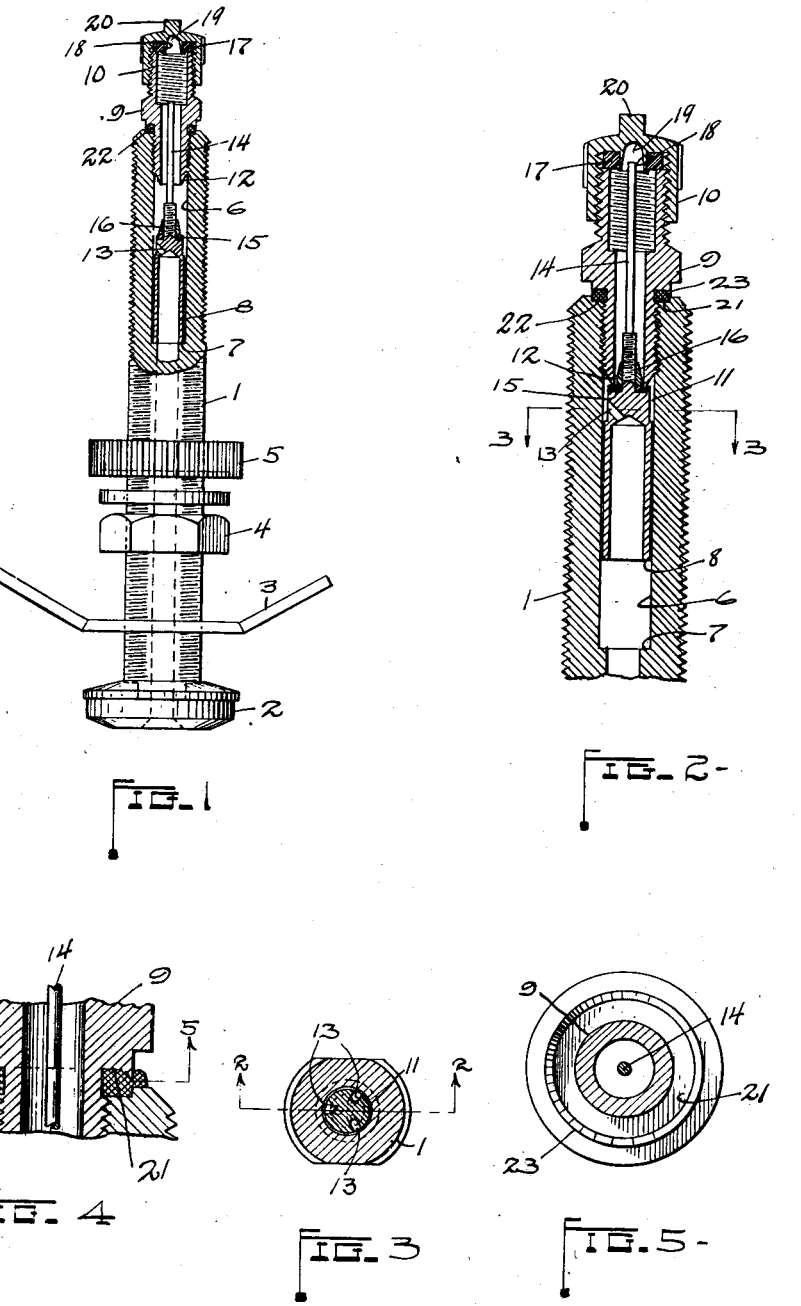
W. B. BURKE.
VALVE.
APPLICATION FILED NOV. 13, 1911.
1,101,008.
Patented June 23, 1914.
WITNESSES:
Oliver M. Kappler
Jno. F. Oberlin
INVENTOR—
Wilbur B. Burke
BY J. B. Fay
ATTORNEY

WILBUR B. BURKE, OF CLEVELAND, OHIO.

VALVE.

1,101,008.  Specification of Letters Patent.  Patented June 23, 1914.

Application filed November 13, 1911. Serial No. 660,100.

*To all whom it may concern:*

Be it known that I, WILBUR B. BURKE, a citizen of the United States, and a resident of Cleveland, county of Cuyahoga, and State of Ohio, have invented a new and useful Improvement in Valves, of which the following is a specification, the principle of the invention being herein explained and the best mode in which I have contemplated applying that principle, so as to distinguish it from other inventions.

The present improvements relate more particularly to valves for use in connection with pneumatic tires, such as are largely employed on automobiles and the like.

The object of the invention is to provide a valve that when closed will securely retain the air within the tire, so as to prevent leakage, while when open the capacity of the valve is sufficient to permit the passage of air therethrough in either direction without unduly obstructing it.

A further object is to eliminate, as far as possible, all superfluous parts, such as springs and the like, the excess of pressure within the tire being utilized to retain the valve in its closed position.

To the accomplishment of the foregoing and related ends, the said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing: Figure 1 is a side elevation, with part in section, of my improved valve; Fig. 2 is a sectional representation, on a larger scale, of the upper portion of said valve, and shows, moreover, the valve member proper in its closed position, instead of open as in Fig. 1; Fig. 3 is a transverse section taken on the line 3—3, Fig. 2; Fig. 4 is a section of a detail of the valve appearing in Fig. 2, and showing the manner in which a certain washer or gasket is secured in place; while Fig. 5 illustrates in plan view, one of the parts coöperating with such gasket. The body 1 of the valve is shown as of usual tubular construction, being provided with a flange 2 at its lower or inner end, and with means, including a plate 3 and associated nut 4, that coöperate with such flange to secure said valve body to the tire (not shown). Another nut 5 for clamping the valve body to the rim is also shown. The outer portion, or free end, of the valve body is slightly reduced in diameter, this portion being threaded in order to receive a dust cap (not shown), which incloses the portion of the valve that normally projects through the wheel rim or felly.

The passage or opening 6 through the valve body is of uniform bore, save in such outer portion where it is somewhat enlarged so as to provide a shoulder 7 directed toward its outer end against which shoulder the valve member 8, proper, may rest when in its inner and inoperative position, as shown in Fig. 1. This enlarged portion of the passage is internally threaded for a part of its extent to receive an externally threaded seat-member 9 that projects beyond the end of the valve body and is threaded to receive a cap 10. The inner end of member 9 forms an annular valve seat 12 that is directed inwardly from the walls of the body-member 1 and is externally beveled so as to provide an inwardly directed annular seat, with a relatively sharp edge that is spaced clear of the surrounding wall of the body 1.

The valve-member, the construction of which is clearly shown in Fig. 2, is of general tubular form, being open at its inner or lower end, and provided with a head 11 at the other or outer end that is adapted to contact with the aforesaid seat, said valve closing with the flow of fluid outwardly through the passage in the valve body; in other words, said valve will be seated by an excess of pressure in the tire wherewith the valve body is connected, as will be readily understood. The forward end of the valve member, including such head, is desirably made of a smaller diameter than the remainder of the body so as to provide an open annular space adjacent to the valve seat, and apertures 13 are provided in the solid piston head of the valve leading from its interior into such annular space. These apertures are preferably inclined forwardly toward the seat in the fashion clearly indicated in Fig. 2, being in such alinement with said seat as to direct the fluid thereagainst when the valve member is open, as described in my Patent No. 972,677, dated October 11, 1910, which relates broadly to this feature of construction. The number of such apertures 13 is a matter of selection, three being shown, (see Fig. 3). The general effect of the construction and arrangement of the valve member and these apertures, taken in conjunction with the annular space surrounding the valve head and seat, is to provide a relatively free passage for the air through the valve when said member is open; in other words, the passages communicate directly and with no sharp turns or corners, while no springs or like constructions whatever, are involved. Consequently, when the valve is detached from the tire, or if the latter is deflated, the valve-member is unrestrainedly reciprocable in both directions.

Extending from the outer face of the valve head, which contacts with the seat, and in line with the axis of the valve, is a stem or deflating member 14 of such length that its outer end projects well into or even through the seat member in the closed position of the valve. The use of this stem as an operating member for opening the valve against the pressure behind the latter, will be readily understood. Such outer face of the valve head is furthermore provided with a washer 15 of softer material than the metal whereof the parts thus far described are fashioned, as for example, rubber. To receive this washer the head is provided with an annular recess of a depth substantially equal to the thickness of the washer. The latter is then held in place by means of a small nut 16 threaded over the aforesaid central stem or deflating member, such nut being of tapering form with its larger diameter opposed to the washer and very nearly equaling that of the bore through the seat-member 9. Said nut, accordingly, is adapted to support the washer closely adjacent to the line of contact between the latter and the annular seat. The tendency which, accordingly, may at times become manifest for the washer, where of rubber, to stick to such seat, is readily overcome without damage occurring to said washer, since it is thus supported close to the contacting edge. Moreover, should for any reason the one face of the washer become damaged, so as to no longer make a tight fitting closure with the seat, by simply removing the nut, the washer may be reversed and thus rendered at least temporarily efficient again.

A tight seat is desirably formed between the cap 10 and the outer projecting end of the seat-member, and with this in view, a similar, but larger washer 17, preferably of packing material similar to that on the valve, is mounted on the under face of said cap, so as to bear against the outer edge of the seat member. A recess is likewise formed to receive this washer, the wall 18 between such recess and a central recess 19 into which the deflating valve stem 14 extends, being so thin that the edge of such wall may be reamed or otherwise bent over to securely lock the washer, thus preventing its displacement and possible loss. Such central recess 19 in the cap extends upwardly into a boss or lug 20 on the outer face of the cap which is available to depress the valve stem when it is desired to open the valve, in order to deflate the tire. In this way it is seen that space is economized just as in the case of the valve head, without increasing the longitudinal or diametral dimensions of the valve over those at present recognized as standard.

It is, of course, necessary that a tight fitting joint be also effected between the seat-member 9 and the outer end of the valve body or casing 1. Such seat-member is, accordingly, provided with a shoulder 21 opposed to such end of the body, while the latter is recessed to receive a washer 22, preferably of lead, or equivalent material. The shoulder on the seat member is provided with a circular lip 23 made with a sharp cutting edge (see Figs. 4 and 5), so disposed as to lie within the outer edge of the recess in the body member and so have a telescoping relation thereto. A washer of a width larger than the recess is then employed, but by drawing down the seat member, the raised lip will cut away the superfluous portion of such washer, at the same time that the latter is forced into the recess. A tight fit is thus insured, while the lip protects the outer edge of the washer and is adapted, as the latter is compressed, to itself enter the recess, should this become necessary.

The foregoing improved construction of packing joint forms the subject matter of a divisional application filed by me May 22, 1914, Serial No. 840,161.

The foregoing construction of valve has been found in actual practice not only to provide a thoroughly effective closure for tires under all pressures ordinarily employed therein, but also by reason of its simplicity and fewness of parts, to afford little opportunity for getting out of order. In fact the only portion that may require renewal, is the washer on the front face of the valve member, and such washer may be changed for a fresh one with very little trouble. In particular, the entire absence of compression springs and like devices, usually employed in valves of this class, is to be pointed out as a distinguishing and significant feature. When in use, it may be remarked that absolutely no resistance to the charging pressure is experienced, as the valve opens voluntarily when the charging pressure equals that within the tire and is promptly closed, without loss, by the pressure within the tire whenever such charging pressure falls below the latter Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a tubular body-member; means on one end of said member for securing the same to a tire or the like, said member having its bore provided with an inwardly directed shoulder adjacent to such end; a second tubular member threaded into the other end of said body-member and provided with a seat facing such shoulder; and a tubular valve-member unrestrainedly reciprocable in both directions between the shoulder and the seat, said valve-member being open at one end and provided with a head at its other end arranged to abut against such seat, and having apertures through its head, substantially as described.

2. In a device of the character described, the combination of a tubular body-member; means on one end of said member for securing the same to a tire or the like, said member having its bore provided with an inwardly directed shoulder adjacent to such end; a second tubular member threaded in the other end of said body-member, the inner end of said second member being externally beveled to form a valve seat facing such shoulder; and a tubular valve-member unrestrainedly reciprocable in both directions between such shoulder and seat, said valve member being open at one end and provided with an apertured head at its other end arranged to abut against such seat, the aperture in the head opening outside the line of its contact with the seat.

3. In a device of the character described, the combination of a tubular body-member; means on one end of said member for securing the same to a tire or the like, said member having its bore provided with an inwardly directed shoulder adjacent to such end; a second tubular member threaded in the other end of said body-member, the inner end of said second member being externally beveled to form a valve seat facing such shoulder; and a tubular valve-member unrestrainedly reciprocable in both directions between such shoulder and seat, said valve-member being substantially of the same diameter as the bore in said body-member, and being open at one end and having an apertured head of reduced diameter at its other end arranged to abut against such seat.

4. In a device of the character described, the combination of a tubular body-member; means on one end of said member for securing the same to a tire or the like, said member having its bore provided with an inwardly directed shoulder adjacent to such end; a second tubular member threaded in the other end of said body-member, the inner end of said second member being externally beveled to form a valve seat facing such shoulder; and a tubular valve-member unrestrainedly reciprocable in both directions between such shoulder and seat, said valve-member being substantially of the same diameter as the bore in said body-member, and being open at one end and having an apertured head of reduced diameter at its other end arranged to abut against such seat, the apertures in said valve-member opening into the annular space between such head and the walls of said body-member.

5. In a device of the character described, the combination of a tubular body-member; means at one end of said member for securing the same to a tire or the like, said member having its bore formed with an integral inwardly directed shoulder adjacent to such end; a second tubular member threaded into the other end of said body-member, the inner end of said second member being externally beveled to form a valve seat with a relatively sharp edge spaced clear of said body-member and facing such shoulder; and a tubular valve-member unrestrainedly reciprocable in both directions between such shoulder and seat, said valve-member being of substantially the same diameter as the bore in said body-member, and being open at one end and having an apertured head of reduced diameter at its other end arranged to abut end-on against such seat, the apertures in said valve-member opening into the annular space between such head and the wall of said body-member and inclining forwardly so as to direct the fluid against such seat when said valve is open.

6. In a device of the character described, the combination of a tubular body-member; means at one end of said member for securing the same to a tire or the like, said member having its bore formed with an integral inwardly directed shoulder adjacent to such end; a second tubular member threaded into the other end of said body-member, the inner end of said second member being externally beveled to form a valve seat with a relatively sharp edge spaced clear of said body-member and facing such shoulder; a tubular valve-member unrestrainedly reciprocable in both directions between such shoulder and seat, said valve-member being of substantially the same diameter as the bore in said body-member, and being open at one end and having an apertured head of reduced diameter at its other end arranged to abut end-on against such seat, the apertures in said valve-member opening into the annular space between such head and the wall of said body-member and inclining forwardly so as to direct the fluid against such seat when said valve is open; a stem projecting from the head of said valve-member into said second member; and a washer of relatively soft material secured to the head of valve-member around said stem.

7. In a device of the character described, the combination of a tubular body-member; means at one end of said member for securing the same to a tire or the like, said member having its bore formed with an integral inwardly directed shoulder adjacent to such end; a second tubular member threaded into the other end of said body-member, the inner end of said second member being externally beveled to form a valve seat with a relatively sharp edge spaced clear of said body-member and facing such shoulder; a tubular valve-member unrestrainedly reciprocable in both directions between such shoulder and seat, said valve-member being of substantially the same diameter as the bore in said body-member, and being open at one end and having an apertured head of reduced diameter at its other end arranged to abut end-on against such seat, the apertures in said valve-member opening into the annular space between such head and the wall of said body-member and inclining forwardly so as to direct the fluid against such seat when said valve is open; a stem projecting from the head of said valve-member into said second member; a washer of relatively soft material surrounding said stem adjacent to the face of said valve-member head; and a nut threaded on said stem and adapted to secure said washer in place, said nut being of smaller diameter than the bore of said seat member.

Signed by me this 10th day of November, 1911.

WILBUR B. BURKE.

Attested by:
ANNA L. GILL,
JNO. F. OBERLIN.